United States Patent
Zwiegincew et al.

(10) Patent No.: US 6,633,968 B2
(45) Date of Patent: Oct. 14, 2003

(54) PRE-FETCHING OF PAGES PRIOR TO A HARD PAGE FAULT SEQUENCE

(75) Inventors: Arthur Zwiegincew, Kirkland, WA (US); James E. Walsh, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 416 days.

(21) Appl. No.: 09/794,851

(22) Filed: Feb. 27, 2001

(65) Prior Publication Data

US 2002/0019723 A1 Feb. 14, 2002

Related U.S. Application Data

(63) Continuation-in-part of application No. 09/282,499, filed on Mar. 30, 1999, now Pat. No. 6,317,818.

(51) Int. Cl.[7] ............................................... G06F 12/00
(52) U.S. Cl. ....................................................... 711/213
(58) Field of Search ................................ 711/203, 204, 711/209, 213, 217, 221; 712/207

(56) References Cited

U.S. PATENT DOCUMENTS

| | | | |
|---|---|---|---|
| 5,150,472 A | * 9/1992 | Blank et al. | 711/137 |
| 5,694,568 A | 12/1997 | Harrison, III et al. | |
| 5,925,100 A | 7/1999 | Drewry et al. | |
| 6,047,363 A | 4/2000 | Lewchuk | |

OTHER PUBLICATIONS

*An effective on–chip preloading scheme to reduce data access penalty*; Jean–Loup Baer and Tien–Fu Chen; *Proceedings of the 1991 conference on Supercomputing*, 1991, pp. 176–186.

*Optimal prepaging and font caching*; David R. Fuchs and Donald E. Knuth; *ACM Trans. Program. Lang. Syst.* 7, 1 (Jan. 1985), pp. 62–79.

*An architecture for software–controlled data prefetching*; Alexander C. Klaiber and Henry M. Levy; *Proceedings of the 18th annual international symposium on Computer architecture*, 1991, pp. 43–53.

*An effective programmable prefetch engine for on–chip caches*; Tien–Fu Chen; *Proceedings of the 28th annual international symposium on Microarchitecture*, 1995, pp. 237–242.

(List continued on next page.)

Primary Examiner—Kevin Verbrugge
(74) Attorney, Agent, or Firm—Merchant & Gould (57) ABSTRACT

A method for pre-fetching of pages prior to a hard page fault sequence is described. A scenario file comprising a list of pages that need to be pre-fetched may be created. A scenario that requires pre-fetching may be automatically detected when process creation begins (such as at application startup or system boot). The scenario begins and it is determined whether or not a scenario file exists for the scenario. If not, the process continues (for example, the application is started up and run, the system is booted, etc.). If a scenario file does exist, the pages in the scenario file are pre-fetched to RAM. The process continues (application is started up and run, the system is booted, etc.). Pages that are used by the application are logged into a scenario log. The scenario log is also used to log page faults. An end scenario timer is started and it is determined whether a page fault (soft or hard) has been detected. Page faults are logged into memory (the scenario log) and the end scenario timer is reset each time a new page fault is encountered. If the end scenario timer has reached a predetermined threshold, the scenario ends and a work item is queued to post-process the scenario log and scenario file during idle time. The scenario file and scenario log are processed and an updated scenario file is written out to the disk space.

19 Claims, 5 Drawing Sheets

OTHER PUBLICATIONS

*Modelling contention sensing memory management systems—A VAX/VMS case study*; C.P. Singer and P. Biswas; *Mathematical and Computer Modelling*, 1990, v.14, pp. 184–189.

*Distributed, configurable memory management in an operating system supporting quality of service*; I. McDonald; *Proceedings of the 7th IEEE Workshop on Future Trends of Distributed Computing Systems*, 1999, pp. 191–196.

*On minimizing the number of page faults with complete information*; T.F. Gonzales; *10th IMACS World Congress on System Simulation and Scientific Computation*, 1982, pp. 279–281, vol. 4.

*How to pack trees*; J. Gil and A. Itai; *Journal of Algorithms*, 1999, V.32, N2 (AUG) pp. 108–132.

\* cited by examiner

PRE-FETCHING OF PAGES PRIOR TO A HARD PAGE FAULT SEQUENCE

REFERENCE TO RELATED APPLICATIONS

This is a continuation-in-part of U.S. patent application Ser. No. 09/282,499, entitled "PRE-FETCHING OF PAGES PRIOR TO A HARD PAGE FAULT SEQUENCE", filed Mar. 30, 1999, now U.S. Pat. No. 6,317,818, which is incorporated by reference herein.

TECHNICAL FIELD

This invention relates in general to the management of pages for improved performance of an application program module during hard page fault intensive scenarios. More particularly, the present invention relates to the reduction of hard page faults by pre-fetching pages into memory prior to the occurrence of a hard page fault sequence.

BACKGROUND

In a computer system, physical memory refers to a hardware device that is capable of storing information. In common usage, physical memory refers to semiconductor storage (RAM) that is connected to the processing unit of the computer system. Many modem processing units and operating systems also support virtual memory. Virtual memory is a technique that allows smaller and/or partially simulated memory devices to be represented as a large uniform primary memory source. In operation, application program modules access memory through virtual addresses, which are then mapped by the operating system in conjunction with a memory management unit (MMU) onto physical memory addresses.

In the context of a paging memory system, a "page" is defined as a fixed-size block of bytes whose physical address can be changed via the MMU, working in conjunction with a Virtual Memory Manager. A page is either mapped onto a physical address or is not present in RAM, in which case it is stored on a disk storage in a page file. A "hard page fault" is an exception that occurs when an application program module attempts to access a virtual memory page that is marked as being not present in RAM. When a hard page fault occurs, the Virtual Memory Manager must access disk storage to retrieve the data for the requested page.

Application program modules are typically disk-bound. In other words, disk access and transfer times are limiting factors of the performance speed of an application program module. Disk access time refers to the time required by a disk drive to access disk storage and respond to a request for a data read or write operation. Therefore, the performance of an application program module is significantly limited during hard page fault intensive scenarios.

There are various potential solutions to the performance bottleneck caused by disk access time during hard page fault scenarios. An obvious potential solution is to reduce disk access time. The reduction of disk access time is primarily a hardware consideration and is not easily accomplished. However, other potential solutions involve the manipulation of memory storage through software program modules.

For example, one prior solution involves manipulating pages such that related blocks of memory are stored together on the same or an adjacent page. More specifically, application program module code is typically stored in pages in the order in which a compiler processed the source code, not in the order in which it will be executed. Therefore, when a page is accessed by an application program module, it is likely that only a portion of the requested code is stored thereon and one or more hard page faults will occur to retrieve additional requested code from other pages. Manipulating the pages so that related code is stored on the same or adjacent pages reduces the number of pages required to execute the code and thus reduces hard page faults. Implementing this approach requires an extra per-application effort. Also, it is not always possible to manipulate code in pages in an efficient manner.

Another prior solution involves strategically ordering pages in disk storage. According to this prior solution, the order in which pages will likely be accessed during typical usage of an application program is determined based on the assumption that disk access patterns are similar from run to run. Then, pages are stored in disk storage in the determined order. A strategic ordering of pages will result in a reduction of hard page fault times. However, this approach is somewhat limited by the fact pages may be accessed more than once by an application program. Therefore, additional hard page faults may occur when a particular page must be re-retrieved from disk storage. Strategically ordering pages in disk storage tends to work best when it is employed to reduce hard page faults in a single hard page fault scenario, typically boot.

Another prior technique to reduce the performance bottleneck caused by disk access time during hard page fault scenarios involves decreasing the amount of pages associated with an application program module. Reducing the number of pages containing code executed by an application program module necessarily reduces the number of hard page faults that may possibly occur during execution of the application program module. However, the reduction of memory associated with an application program module requires significant effort on the part of the programmer, or improvements in compiler technologies, to streamline the application program module. Also, end-users demand application program modules having extremely robust functionality and complex graphics capabilities. Thus, it is becoming increasingly more difficult to streamline application program modules while meeting market demands.

Thus, there remains a need for a method and system for improving the performance of an application program module by reducing disk access time without burdening the programmer.

There further remains a need in the art for a method and system for reducing hard page faults during execution of an application program module without detracting from the robustness of the application program module.

SUMMARY OF THE INVENTION

The present invention meets the needs described above by providing a system and method for improving the performance of an application program module by reducing the occurrence of hard page faults during the operation of an application program module. The present invention may be embodied in an add-on software program module that operates in conjunction with the application program module. In this manner, no effort is required on the part of the application programmer to manipulate or modify the application program module in order to improve performance. Furthermore, the add-on software program module does not detract from the intended operation of the application program module.

In one aspect, the present invention is a method for avoiding hard page faults during the booting of an operating system of a computer system. Prior to booting the operating system, it is determined which pages will need to be retrieved from disk. When the operating system needs to be booted, the determined pages are loaded into a RAM of the computer system, whereby the determined pages will be available in the RAM and hard pages faults will not occur during the booting of the operating system. The step of determining which pages will be retrieved from disk may include creating a log of hard page faults that occur during the booting of the operating system, analyzing the log to find a common hard page fault scenario for booting the operating system, and determining from the log which pages were retrieved from disk during the common hard page fault scenario. A copy of each of the determined pages may be stored in a scenario file. Alternatively, a reference for each of the determined pages may be stored in a referenced scenario file.

As described above, the scenario file may be a referenced scenario file including a number of page references wherein each page reference includes a reference to section information (file name and whether the file is mapped as data or as an image) and a file offset for the referenced page. Alternatively, each page reference may include a physical disk sector for the page. The section information table that the page references refer to, is also stored in the scenario file.

In yet another aspect, the invention is a method for automatically detecting a hard page fault scenario. The start-up of an application program module is detected and the hard page fault scenario begins. It is determined if a scenario file exists. If not, then the application program module is run and a scenario file is created. If a scenario file already exists, then the pages in the scenario file are fetched into RAM and the application program module is run. When the application begins to run, an end scenario timer is started and soft page faults and hard page faults are logged. Each time a page fault is logged, the end scenario timer is reset. If the time period between two page faults is such that the end scenario timer reaches a predetermined threshold, then the hard page fault scenario is ended.

A queue may generate a work item to post-process the scenario file and scenario log. During idle time, the scenario file and scenario log may be post-processed. A scenario file may then be written to the disk space.

As part of post-processing the scenario file and scenario log, it may be determined which pages are part of the scenario log and not already in the scenario file. These pages are added to the scenario file. Scenario file entries corresponding to pages that were used during the scenario are updated to indicate that the page was used by the scenario. Scenario file entries for pages that have not been used for a predetermined number of times are deleted from the scenario file. The scenario file entries may then be sorted according to the section ID and file offset of each page represented by each scenario file entry.

In another aspect, the invention is a method for detecting a hard page fault scenario. The start-up of an application program module is detected and it is determined whether a scenario file exists. If a scenario file exists, then the pages in the scenario file are pre-fetched into RAM and the application program module is run. Any soft page faults or hard page faults are logged into memory. The hard page fault scenario may end when a Win32 hourglass cursor is replaced with a regular cursor.

In still another aspect, the invention is a method for building a plurality of memory descriptor lists (MDLs) for mapping to physical memory a plurality of pages referenced in a scenario file. It is determined whether each page referenced in the scenario file is already resident in physical memory and, if so, then these pages are discarded from consideration. For all pages not resident in physical memory, it is determined whether the file offsets for each pair of consecutive pages is below a predetermined level and if so, then the pages are put into the MDL. If the pages are not consecutive, the gap between the pages is plugged by inserting a required number of dummy pages into the MDL.

These and other aspects, features and advantages of the present invention may be more clearly understood and appreciated from a review of the following detailed description of the disclosed embodiments and by reference to the appended drawings and claims.

DETAILED DESCRIPTION OF EMBODIMENTS OF THE INVENTION

The present invention is directed to a system and method for managing pages in order to improve the performance of an application program module or an operating system during hard page fault scenarios. The present invention is operable to detect and analyze a potential hard page fault scenario. In analyzing the potential hard page fault scenario, the present invention determines which pages will have to be retrieved from disk upon the occurrence of a hard page fault sequence. Then, prior to the occurrence of the potential hard page fault sequence, the present invention pre-fetches into RAM most, if not all, of the determined pages. Accordingly, no hard page fault will occur when the application program module or operating system attempts to access the determined pages. Thus, the performance speed of the application program module or operating system is improved due to fewer disk seeks. Those skilled in the art should appreciate that the definition of a hard page fault scenario is arbitrary, i.e., a single lengthy scenario could be 'split' into multiple smaller scenarios. Thus, pages may be pre-fetched in segments, one segment per 'smaller' scenario, resulting in a spreading out of the demand for a single large amount of memory in which to read the prefetched pages.

A hard page fault occurs when a page requested by the application program or operating system is not available in RAM. The order in which pages are likely to be requested in a particular hard page fault scenario is determined. A referenced scenario file is created to store a list of the determined pages. A pre-fetcher is used to load an appropriate scenario file into RAM prior to the occurrence of a particular hard page fault sequence. Then, during the particular hard page fault scenario, the requested pages will be found on the hard disk and passed into RAM before a hard page fault occurs.

Exemplary Operating Environment

Figure 1:
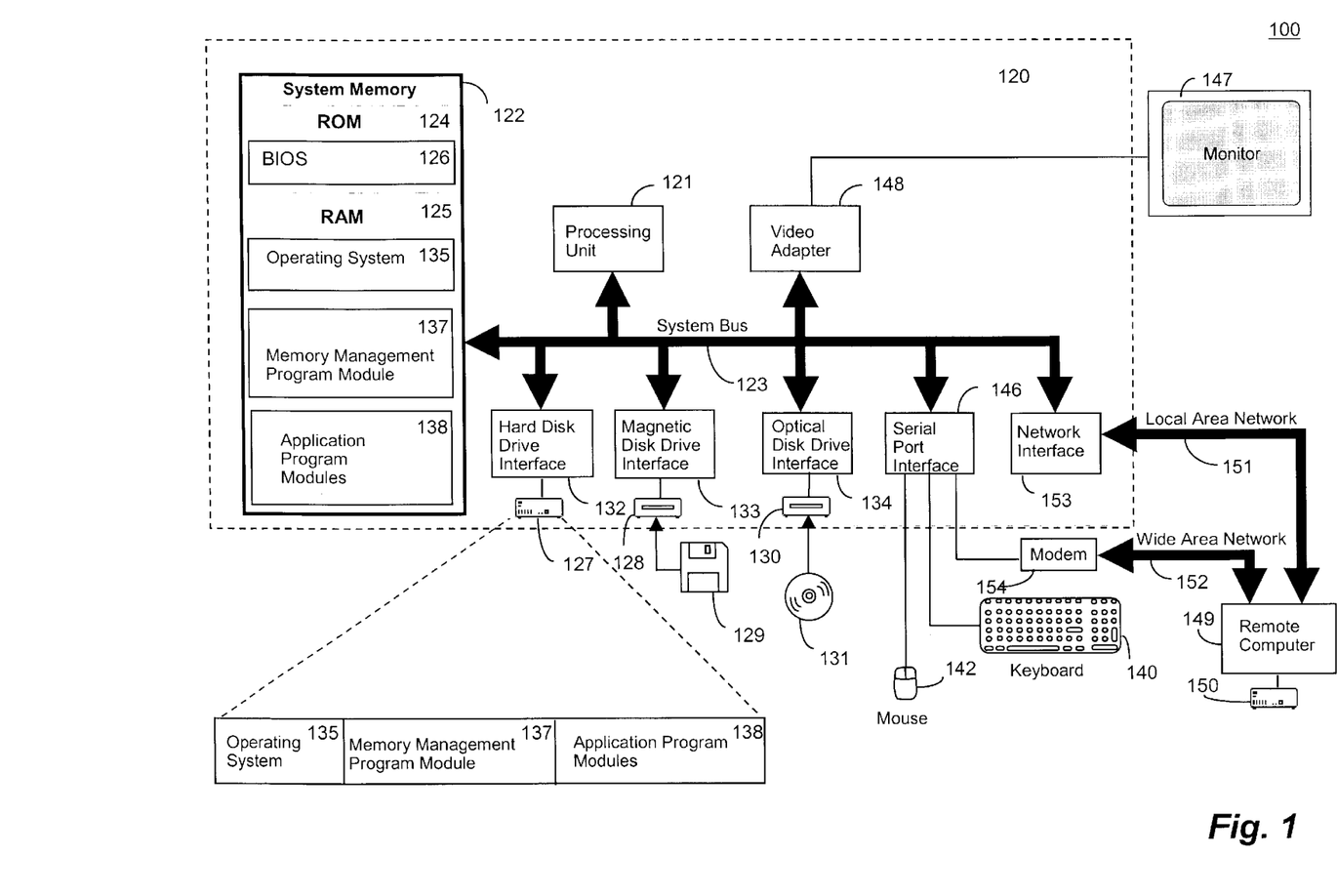
FIG. 1 is a block diagram of a personal computer illustrating an operating environment for an exemplary embodiment of the present invention.

The following description will hereinafter refer to the drawings, in which like numerals indicate like elements throughout the several figures. FIG. 1 and the following discussion are intended to provide a brief and general description of a suitable computing environment 100 for implementation of the present invention. The exemplary operating environment 100 includes a conventional personal computer system 120, including a processing unit 121, a system memory 122, and a system bus 123 that couples the system memory 122 to the processing unit 121. The system memory 122 includes read only memory (ROM) 124 and random access memory (RAM) 125. A basic input/output system 126 (BIOS), containing the basic routines that help to transfer information between elements within the personal computer system 120, such as during start-up, is stored in ROM 124.

The personal computer system 120 further includes a hard disk drive 127, a floppy disk drive 128, e.g., to read from or write to a removable magnetic disk 129, and an optical disk drive 130, e.g., for reading a CD-ROM disk 131 or to read from or write to other optical media. The hard disk drive 127, removable magnetic disk drive 128, and optical disk drive 130 are connected to the system bus 123 by a hard disk drive interface 132, a removable magnetic disk drive interface 133, and an optical drive interface 134, respectively. The drives and their associated computer-readable media provide nonvolatile storage for the personal computer system 120. Although the description of computer-readable media above refers to a hard disk, a removable magnetic disk and a CD-ROM disk, it should be appreciated by those skilled in the art that other types of media that are readable by a computer system, such as magnetic cassettes, flash memory cards, digital video disks, Bernoulli cartridges, and the like, may also be used in the exemplary operating environment.

The computer system 120 may include additional input devices (not shown), such as a microphone, joystick, game pad, satellite dish, scanner, or the like. These and other input devices are often connected to the processing unit 121 through a serial port interface 146 that is coupled to the system bus 123, but may be connected by other interfaces, such as an IEEE 1394 bus or a universal serial bus (USB). A monitor 147 or other type of display device is also connected to the system bus 123 via an interface, such as a video adapter 148. In addition to the monitor, personal computer systems typically include other peripheral output devices (not shown), such as speakers or printers.

The personal computer system 120 may operate in a networked environment using logical connections to one or more remote computer systems, such as a remote computer system 149. The remote computer system 149 may be a server, a router, a peer device or other common network node, and typically includes many or all of the elements described relative to the personal computer system 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets and the Internet.

When used in a LAN networking environment, the personal computer system 120 is connected to the LAN 151 through a network interface 153. When used in a WAN networking environment, the personal computer system 120 typically includes a modem 154 or other means for establishing communications over a WAN 152, such as the Internet. The modem 154, which may be internal or external, is connected to the system bus 123 via the serial port interface 146. In a networked environment, program modules depicted relative to the personal computer system 120, or portions thereof, may be stored in the remote memory storage device 150. It will be appreciated that the network connections shown are exemplary and other means of establishing a communications link between the computer systems may be used. It will be further appreciated that the invention could equivalently be implemented on host or server computer systems other than personal computer systems, and could equivalently be transmitted to the host computer system by means other than a CD-ROM, for example, by way of the network connection interface 153.

A number of program modules may be stored in the drives and RAM 125 of the computer system 120. Program modules control how the computer system 120 functions and interacts with the user, with I/O devices or with other computers. Program modules comprise routines, data structures and other software or firmware components. Examples of program modules are operating systems 135 and application program modules 138. In an exemplary embodiment, the present invention may comprise one or more memory management program modules 137 stored on the drives or RAM 125 of the computer 100. Specifically, program modules 137 of the present invention may comprise computer implemented instructions for determining which pages will have to be retrieved from disk during a potential hard page fault scenario and pre-fetching the determined pages into RAM prior to the occurrence of the potential hard page fault sequence.

Those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 2:
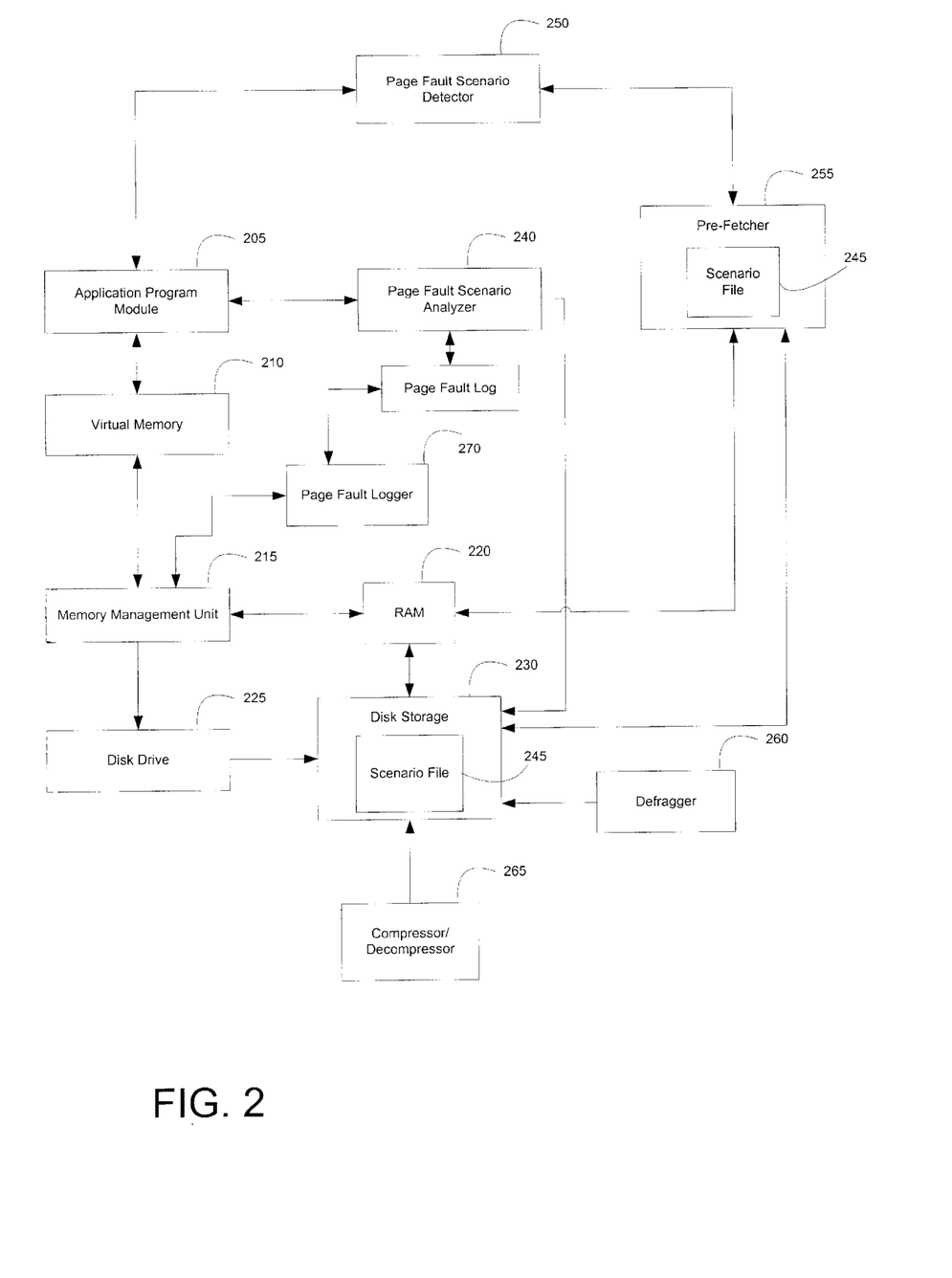
FIG. 2 is a functional block diagram illustrating operation of an exemplary embodiment of the present invention.

FIG. 2 is a functional block diagram illustrating operation of an exemplary embodiment of the present invention. As shown, an application program module 205 interacts with a virtual memory device 210 to access data stored in pages. It should be understood that the application program module 205 may instead be an operating system.

The virtual memory device 210 communicates with a memory management unit (MMU) 215, which maps virtual memory addresses onto physical memory addresses in the RAM 220 of the computer system. The MMU, which is a well known device, maintains a record of pages present in the RAM 220. An MMU includes a lookaside cache; requests for pages not recorded by the MMU are redirected to a VMM (not shown). When the requested pages are not present in the RAM 220, they must be retrieved from disk storage 230. In such a situation, the VMM instructs a disk drive 225 to transfer the requested pages into the RAM 220. Typically, the requested pages are swapped with less used pages in the RAM 220. Accordingly, the least recently used pages are stored on the disk storage 230 and the VMM updates its records to reflect the new pages in the RAM 220. Swapping is a memory management technique that is well known in the art. Those skilled in the art will appreciate that the above description of memory management has been provided by way of example only and that other algorithms may be, and often are, employed.

A hard page fault scenario analyzer 240 anticipates and analyzes hard page fault scenarios. As mentioned, a hard page fault scenario is a situation in which a hard page fault sequence is highly likely to occur. The hard page fault scenario analyzer logs various hard page fault scenarios that occur during operation of the application program module 205. The logged hard page fault scenarios are then analyzed to determine if they re-occur frequently, and if they do, they are put in a scenario file. This analysis can occur programmatically on the end-user's computer system, or in advance by the developer of a particular software product. As an example, suppose the application program module 205 is a word processor and that an anticipated hard page fault scenario is the situation in which the user selects a well known "file open" command. In response to the "file open" command, the application program will display a graphical representation of a file directory. However, in order to display the graphical representation of the file directory, a sequence of hard page faults will occur because the word processor must retrieve a particular set of pages from disk. In accordance with an exemplary embodiment of the present invention, the hard page fault scenario analyzer 240 anticipates the "open file" hard page fault scenario of the example and determines the set of pages that will need to be retrieved from disk upon the occurrence of the hard page fault. The determination of pages that will need to be retrieved from disk will be described in greater detail below. The detection of particular classes of hard page fault scenarios may be built into the system. For example, application launch is virtually always a hard page fault scenario, so an exemplary embodiment of the present invention may be configured such that any launch operation of an application program will be considered to be a hard page fault scenario.

Based on the determined pages, the hard page fault scenario analyzer 240 creates a scenario file 245, which is stored in the disk storage 230. The scenario file 245 may comprise ordered copies of the pages that will likely be retrieved from disk due to one or more hard page faults during the hard page fault scenario. The scenario file 245 may comprise multiple copies of a single page. Similarly, multiple scenario files may include copies of the same pages. In this manner, the copies of the pages may be transferred into RAM 220 from the scenario file 245 in the appropriate order without the occurrence of a hard page fault. The transfer of the copies of pages into RAM is discussed below.

In one embodiment of the present invention, the scenario file 245 may be a referenced scenario file comprising ordered references to the pages that are likely to be retrieved from disk storage 230 during a hard page fault scenario, rather than copies of the actual pages themselves. In response to the detection of a begin-of-scenario instruction or a hard page fault scenario, the pages referenced in the scenario file are fetched from disk storage in the optimal manner and are transferred into RAM. In this manner, the requested pages will be available in RAM when requested, and no hard page fault will occur. This exemplary embodiment of the invention will result in more seek operations on disk, but will still allow reading of the required pages in an optimal manner, rather than the 'as needed' ordering if the pages are hard faulted into RAM. As compared to a scenario file 245 comprising ordered copies of the determined pages, a scenario file comprising references to the determined pages reduces disk space requirements.

The hard page fault scenario analyzer 240 may comprise functionality for automatically analyzing hard page fault scenarios and generating corresponding scenario files. By way of illustration, the hard page fault analyzer 240 may log hard page faults that occur upon execution of a process during operation of an application program module 205. During idle time of the application program module 205, the hard page fault scenario analyzer 240 may write the log of hard page faults to a log file. Then, a pattern matching algorithm may be used to find a pattern of hard page faults based on all log files generated for the same scenario. If a pattern of hard page faults is found, a new scenario file may be generated based on the pages that are retrieved from disk during the pattern. Automatically generated scenario files may be subject to subsequent refinement, i.e., they may be input into the pattern-matching algorithm.

The hard page fault analyzer 240 may also comprise various application program interfaces (APIs) for allowing an application program module 205 to explicitly designate certain scenarios as hard page fault scenarios and to instruct the hard page fault scenario analyzer 240 to create a corresponding scenario file. Those skilled in the art will appreciate that the use of such APIs is likely to be faster and more accurate than using functionality for automatically analyzing hard page fault scenarios.

The scenario file 245 may also comprise various other components, such as a "scenario file ID," a "prologue," and an "epilogue." A scenario file ID may be a standard 128-bit GUID, or an equivalent thereof, which is well-known in the art. Additionally, a scenario file may contain a value that decides how page faults are filtered during logging. Three possibilities that might be used are: (a) only the process in the scenario's context is instrumented; (b) same as (a), but including a few particular other processes (e.g. csrss.exe); and (c) all processes in the system are instrumented (e.g. used for system boot prefetching). Prologues and epilogues may be provided as aids for determining the order of hard page fault scenarios. For example, a component of the hard page fault scenario analyzer 240 may be operable to keep track of events leading to and following hard page fault scenarios. A prologue may be used to record events that typically lead to the hard page fault scenario associated with the scenario file 245. The elements of prologues may be stored as pairs in the form of: {image name, page offset}. Similarly, an epilogue may be used to help to predict whether another hard page fault scenario will follow the hard page fault scenario associated with the scenario file 245. For example, an epilogue may be implemented as a list of scenario file IDs, and a decay factor to minimize the number of coincidental hints.

After the hard page fault scenario analyzer 240 has analyzed various hard page fault scenarios of an application program module 205 and has stored corresponding scenario files 245 in the disk storage 230, the hard page fault scenario detector 250 monitors operation of the application program module 205 for the occurrence of a hard page fault scenario. A hard page fault scenario detector may be manual or automatic. A manual hard page fault scenario detector may be programmed to send messages to the pre-fetcher upon the occurrence of particular events, such as by calling a specific API. An automatic hard page fault scenario detector may be operable to analyze prologues and epilogues in scenario files to predict when a hard page fault scenario will occur. When the hard page fault scenario detector 250 detects a hard page fault scenario, it sends a message to a pre-fetcher 255. The message sent to the hard page fault scenario detector 250 instructs the pre-fetcher to fetch from disk storage 230 the scenario file 245 associated with the detected hard page fault scenario. A pre-fetcher 255 typically exists as part of an operating system.

In response to the message received from the hard page fault scenario detector 240, the pre-fetcher 255 accesses the disk drive 225 to retrieve the appropriate scenario file from the disk storage 230. The pre-fetcher 255 then transfers into the RAM 220 the page sequence of the retrieved scenario file 245. The newly transferred pages are placed on a standby list in the RAM 220, which is a technique that is well known to those skilled in the art. As such, the newly transferred pages do not increase the working set, i.e., the pages currently utilized by the application program module 205. Then, as the newly transferred pages are requested by the application program 205, they are soft-faulted into the working set and a hard page fault is avoided. Of course, if the scenario file is a referenced scenario file it will only contain references to the pages needed by the scenario. The references are used by the pre-fetcher to transfer the pages from the hard disk to RAM.

While pre-fetching scenario files 245 into RAM does not increase the working set, it may increase the memory requirements of the computer system. However, those skilled in the art will recognize that not all computer systems will include sufficient memory for proper operation of the exemplary embodiment described above. Accordingly, in low-memory situations, the scenario files may be read in parts, thereby reducing memory requirements. An exemplary embodiment of the present invention includes a defragger 260. The pre-fetching of scenario files may be performed more efficiently when scenario files are physically stored contiguously on the disk storage 230. Many available operating systems include a disk defragger 260. For example, the Windows NT operating system, manufactured and produced by the Microsoft Corporation of Redmond, Wash., supports defragmentation of uncompressed files with the NTFS file system (also manufactured and produced by the Microsoft Corporation). Such available defraggers 260 are sufficient for operation in the present invention. In accordance with an exemplary embodiment, the defragger 260 may be automatically triggered during idle time.

Further, an exemplary embodiment includes a disk compressor/decompressor 265 to compress the copied pages within the stored scenario files 265. Well known compression algorithms may be employed to achieve approximately 50% compression with 25 MB/s decompression throughput. These results may be achieved with as little as 64 KB extra memory. Average disk transfer rates are about 8 MB/s. So, for an illustrative 3 MB pre-fetch scenario, comparative pre-fetch times are as follows:

No compression: 0.012 s (seek)+3 MB/8 MB/s (read)=0.3870 s.

50% compression: 0.012 s (seek)+1.5 MB/8 MB/s (read)+3 MB/25 MB/s (decompress)=0.3195 s.

Thus, there is a 17.5% improvement in pre-fetch time using 50% compression.

As described above with reference to FIG. 2, an exemplary embodiment of the present invention may be comprised of various functional components, including a hard page fault scenario analyzer 240, a hard page fault scenario detector 250, a pre-fetcher 255, a disk defragger 260, and a compressor/decompressor 265. However, those having ordinary skill in the art will recognize that the minimum components required to implement the broad concept of the present invention are a manual hard page fault scenario detector 250 and a pre-fetcher 255. As mentioned, a manual hard page fault scenario detector may be programmed to send instructions to the pre-fetcher 255 upon the occurrence of certain events. Those skilled in the art will further appreciate that an automatic hard page fault scenario detector 250, a scenario analyzer 240, a disk defragger 260 and a compressor/decompressor 265 are optimizations for the present invention. The inclusion of such optimizations will depend on the available memory of the computer system on which the present invention will be run and possible gains to be achieved by operation of the present invention.

Figure 3:
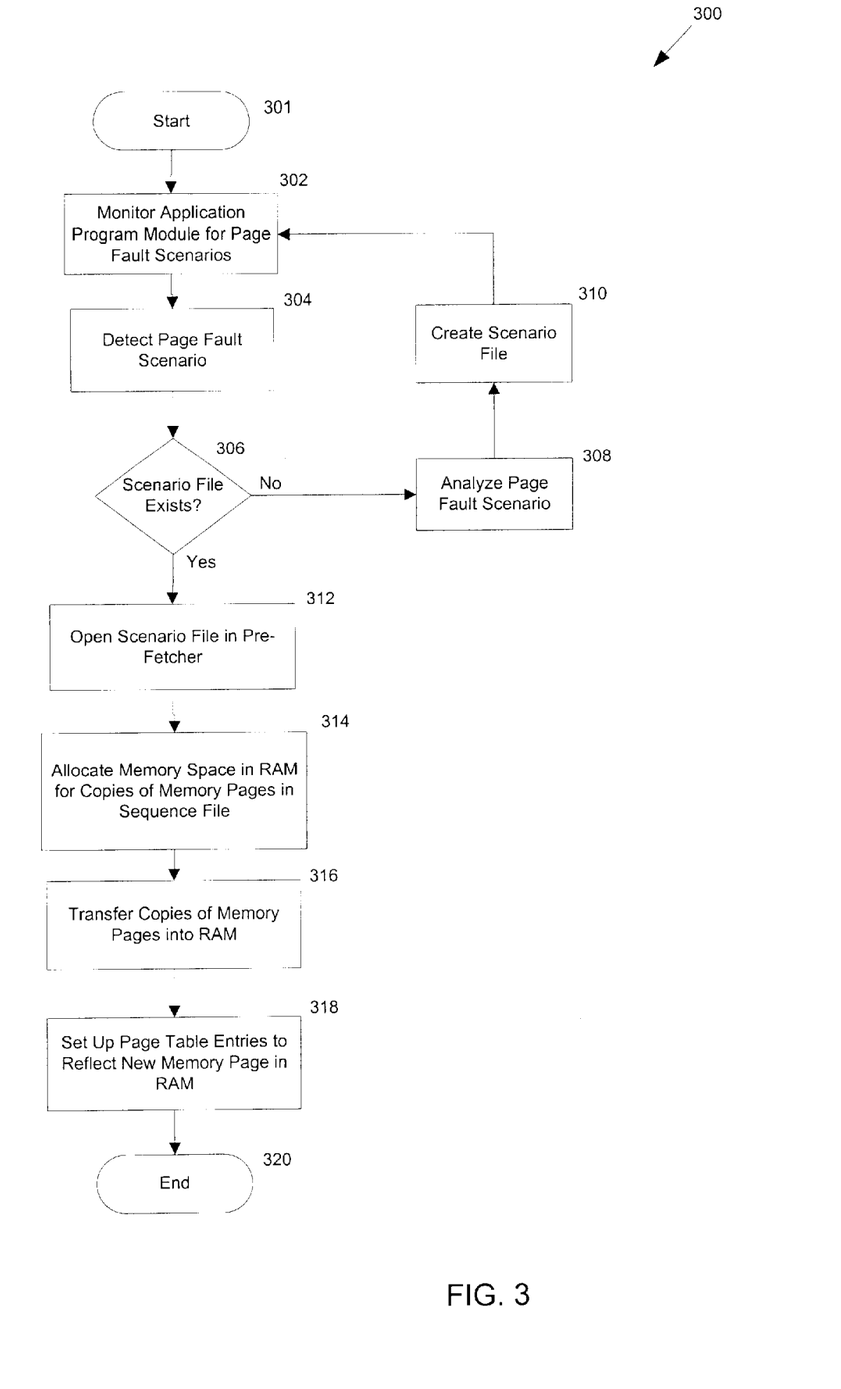
FIG. 3 is a flow diagram illustrating operation of an exemplary embodiment of the present invention.

FIG. 3 is a flow chart illustrating computer-implemented steps for carrying out an exemplary method of the present invention. Those skilled in the art will appreciate that the flow charts of FIGS. 3–4 are executed by the processing unit 121 (FIG. 1) in response to instructions that have been incorporated into the memory management program module 137. The exemplary method 300 begins at starting block 301 where a computer system, such as the computer 100 of FIG. 1, is executing an application program module, such as the application program module 170 of FIG. 1. Alternatively, the application program module may be an operating system. At step 302, the application program module is monitored for the occurrence of events that will lead to a hard page fault scenario. At step 304, a hard page fault scenario is detected. As mentioned above, a hard page fault scenario is a situation in which a hard page fault sequence is likely to occur, i.e., requested pages will be unavailable in RAM and must be retrieved from disk storage. Then, at step 306, a determination is made as to whether a scenario file exists that corresponds to the detected hard page fault scenario. As mentioned above with respect to FIG. 2, scenario files may be stored on disk storage. Scenario files comprise either ordered copies of or references to the pages that are determined to be likely to be retrieved from disk storage during a hard page fault. The copies of or references to the determined pages are stored in the order in which they are likely to be requested by the application program module. If no corresponding scenario file is located, the method proceeds to step 308, where the hard page fault scenario is analyzed to determine which pages must be retrieved from disk and in what order. Then, based on the analysis performed at step 308, a scenario file is created for the detected hard page fault scenario at step 310. Subsequently, the method returns to step 302 to continue monitoring the application program module for subsequent hard page fault scenarios.

If, at step 306, a scenario file was located that corresponds to the hard page fault scenario detected at step 304, the method proceeds to step 312 where the scenario file is opened and its header is retrieved. Then, at step 314, memory space in RAM is allocated for the determined pages that are copied or referenced in the scenario file. At step 316, the determined pages, or copies thereof, are prefetched into the allocated space in RAM. An exemplary implementation only allocates RAM for and prefetches those determined pages, or copies thereof, that don't already exist in system RAM. Lastly, at step 318, page table entries in the Virtual Memory Manager are updated to reflect the new pages transferred into RAM. As described previously, the new pages are pointed to by entries stored in the standby list. Thus, the application program module requests the appropriate pages during the hard page fault scenario, the prefetched pages are soft faulted into the working set of the application program and a hard page fault is avoided.

Referenced Scenario Files

As described above, a referenced scenario file comprises an ordered index, or list, of references to the pages that are likely to be retrieved from disk storage 230 during a hard page fault scenario, rather than copies of the actual pages themselves. The index allows the pre-fetcher 255 to locate each page in the original executable file. Referenced scenario files reduce the amount of disk space occupied by the scenario file because copies of pages are not stored with the scenario file. In scenario files with stored pages, it is difficult to ensure that copies of pages are identical to master copies. Referenced scenario files eliminate system crashes or other incorrect behavior that may result from loading a stored page with incorrect content. Referenced scenario files avoid the need to ensure that the copy of a page matches the original page (even after the original page has been edited). Security of scenario files which store pages is also an issue because copies of pages may appear to have a valid signature but may have been tampered with. Referenced scenario files avoid these security problems.

In a preferred embodiment, the index of a referenced scenario file comprises a file name of each page, a file offset of each page, and a 32-bit bit field for each page representing the last 32 runs of the scenario. The 32-bit field is used to indicate if the page was used during each of the last 32 runs of the scenario. After a scenario has run, the referenced scenario file is cleaned up as will be described below. As part of this cleanup, a one or a zero is entered into the last bit of the 32-bit field for each page to indicate whether or not the page was used during the last run of the scenario. Also as part of the clean-up of the scenario file, if the 32-bit field indicates that a page has not been used during any of the past 32 runs of the scenario, then that page is removed from the scenario file. The 32 bit field indicates whether the page has been called during the last 32 times that the application has been started up. In a preferred embodiment, if a particular page has not been used the last two times the scenario has been run, then the page is not pre-fetched. Also, in a preferred embodiment, if a page has not been used the past thirty two times a scenario has been run, then the page is removed from the scenario file during post-processing of the scenario file.

Automatic Scenario Detection

The beginning and end of a scenario may be manually determined as has been described above. Manual scenario detection may be implemented using Win32 application programming interface (API) calls or a similar feature used by application program modules or operating systems to manually define the beginning and end of a scenario. However, in an embodiment of the present invention, automatic scenario detection is implemented.

Under automatic scenario detection, the beginning and end of a scenario is automatically determined based upon certain events taking place. As will be described in detail below, in one embodiment, a scenario begins and a scenario file is opened (if a scenario file for the scenario already exists) or created (if a scenario file for the scenario does not already exist) at process creation (such as when an application program module file is opened). Pages that are used during the scenario are logged into an internal scenario log. The scenario ends and page faults are no longer logged when the interval between two consecutive page faults for the process rises above a certain timing threshold, such as 100 milliseconds.

Figure 4:
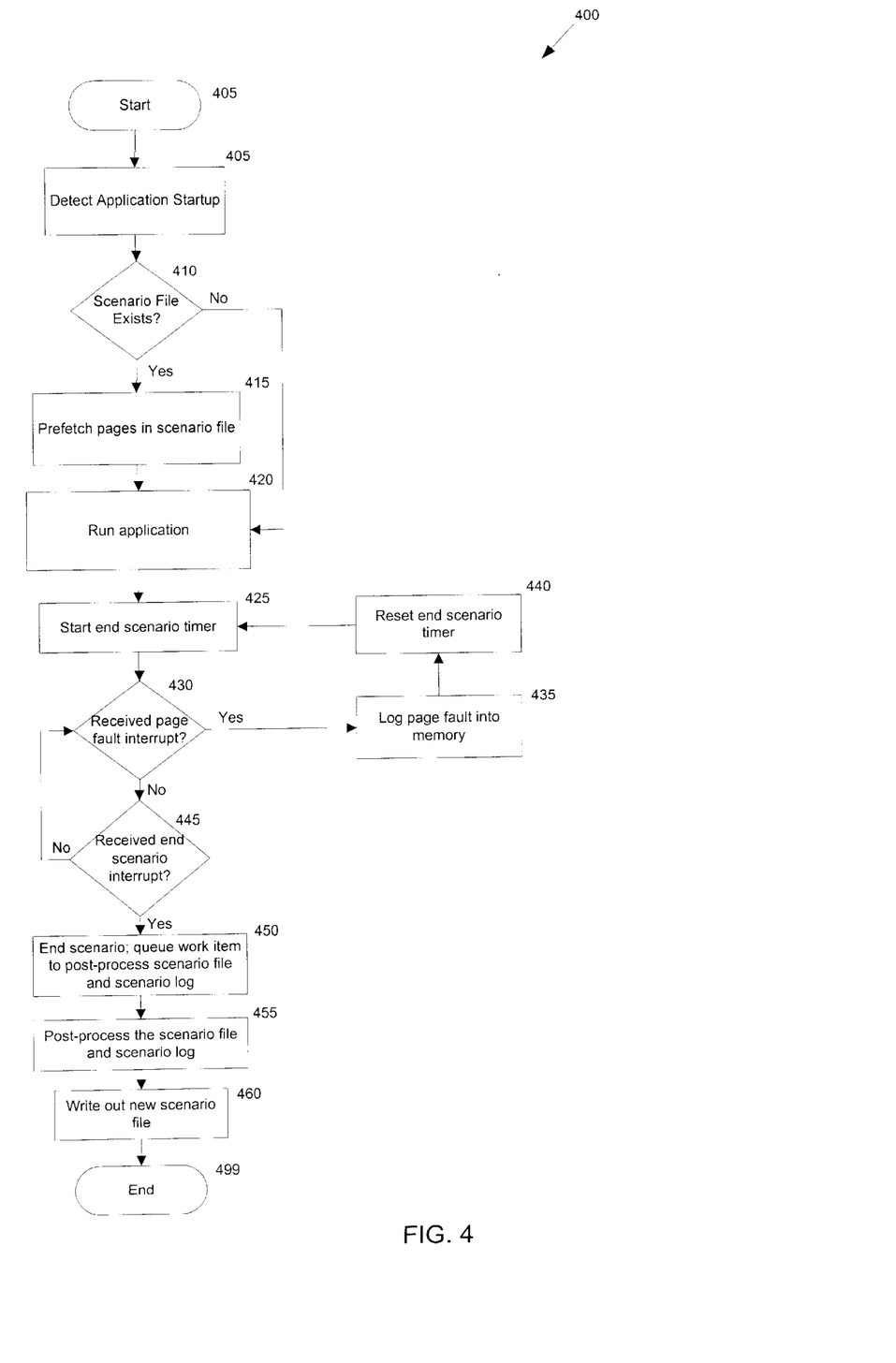
FIG. 4 is a flow diagram illustrating a method for automatic scenario detection in accordance with an embodiment of the present invention.

Referring now to FIG. 4, a flowchart illustrating a method 400 for automatic scenario detection in accordance with an embodiment of the present invention will be described. The method 400 begins at start step 405 and proceeds to step 410 where a process creation begins (such as at application startup or system boot) and the scenario begins. The method then proceeds to decision step 410.

At decision step 410, it is determined whether or not a scenario file exists for the scenario that was started at step 405. If not, then the method proceeds to step 420 and the application is started up and run (or the system is booted, etc.). However, if it is determined that a scenario file does exist, then the method proceeds to step 415.

At step 415, the pages in the scenario file are pre-fetched and the method proceeds to step 420 where the application is started up and run. Pages that are used by the application are logged into a scenario log. The scenario log is used to update the scenario file as will be described below. The method then proceeds to step 425.

At step 425, an end scenario timer is started and the method proceeds to decision step 430.

At decision step 430, it is determined whether an external page fault interrupt has been received from the page fault scenario detector 250. Soft and hard page faults are both logged because a soft page fault may be a hard page fault the next time the scenario is encountered. So, it is important to include soft page faults as part of the scenario file. When the CPU detects a page fault, it generates and sends a page fault interrupt, which is handled by the NT Memory Manager, and forwarded to the page fault logger 270. If a page fault interrupt has been received at decision step 430, then the method proceeds to step 435.

At step 435, the page fault is logged into memory (the page fault log, also known as the scenario log) and the method proceeds to step 440. At step 440, the end scenario timer is reset. The end scenario timer is then started again at step 425.

If, at decision step 430, no page fault has been detected, then the method proceeds to decision step 445. At decision step 445, it is determined whether an end scenario timer interrupt has been received. The end scenario timer interrupt indicates that the end scenario timer has reached a predetermined threshold (such as 100 milliseconds). The predetermined threshold is set so that if the time between two consecutive page faults exceeds the threshold then the scenario will end. The end of a scenario is important to determine because it is inefficient for a scenario to last for a longer time period than necessary.

If, at decision step 445, it is determined that the end scenario timer interrupt has not been received, then the method returns to decision step 430 and it is determined whether a page fault interrupt has been received.

However, if, at decision step 445, it is determined that the end scenario timer interrupt has been received, then the method proceeds to step 450.

At step 450, the scenario ends and a work item is queued to post-process the scenario log and scenario file during idle time. The method then proceeds to step 455.

At step 455, the scenario file and scenario log are processed. In one embodiment, the post-processing includes the following steps:

1. Pages that are part of the scenario log, but not already part of the scenario file are added to the scenario file;
2. The scenario file entries corresponding to the pages that were used during the scenario are updated to indicate that the page was used by the scenario. As described above, a 32-bit field for each page represents the last 32 runs of the scenario. In a preferred embodiment, the rightmost bit in this field is set to indicate whether or not the last run of the scenario required the page;
3. Pages with a scenario file entry with a 32-bit field indicating that the page has not been used in the last 32 runs of the scenario are deleted from the scenario file; and 4. Pages in the scenario file are sorted according to section ID and file offset. Sorting the pages in this manner results in efficient I/O with a minimal number of disk seeks when the pages are prefetched at step 415 (assuming there is a reasonable disk layout).

After the scenario file and scenario log are processed at step 455, the method then proceeds to step 460.

At step 460, an updated scenario file is written out to the disk space. The method then ends at step 499.

It should be understood that the method 400 may include a failsafe timer to end the scenario in case the end scenario timer malfunctions. For example, a failsafe timer may be a predetermined time period (such as 5 seconds) and if the scenario lasts for longer than the predetermined time period, then the scenario automatically ends. This failsafe timer prevents the scenario file from becoming too large (which is inefficient).

It should be understood that the 32-bit fields stored in the scenario file allow the scenario file to be self-tuning. If a page has not been required by a scenario for the last thirty two times, then the page may be removed from the scenario file. Of course, the 32-bit field could be any bit length required.

The two rightmost bits of the 32-bit field may also be used to determine whether a page is pre-fetched. In an embodiment of the present invention, a page is not pre-fetched unless one of the two rightmost bits of the 32-bit field indicates that the page has been required during one or more of the past two times the scenario has been run. Of course, this number may be adjusted as needed to the last five runs, last ten runs, etc.

Using Win32 Hourglass Cursor to Detect End of Scenario

It should be understood that in an alternative embodiment, the beginning of the scenario may be automatic such as at process creation and the end of the scenario may be determined based upon a detection that the Win32 hourglass cursor has been replaced with a regular cursor. Although this embodiment works well, it is not typically as effective as automatically determining the end of a scenario based on a timing threshold.

MDLs (Memory Descriptor Lists)

A memory descriptor list (MDL) is a system structure for describing a virtual buffer in terms of physical memory pages. For each prefetched scenario file, an embodiment of the present invention builds a series of MDLs.

Figure 5:
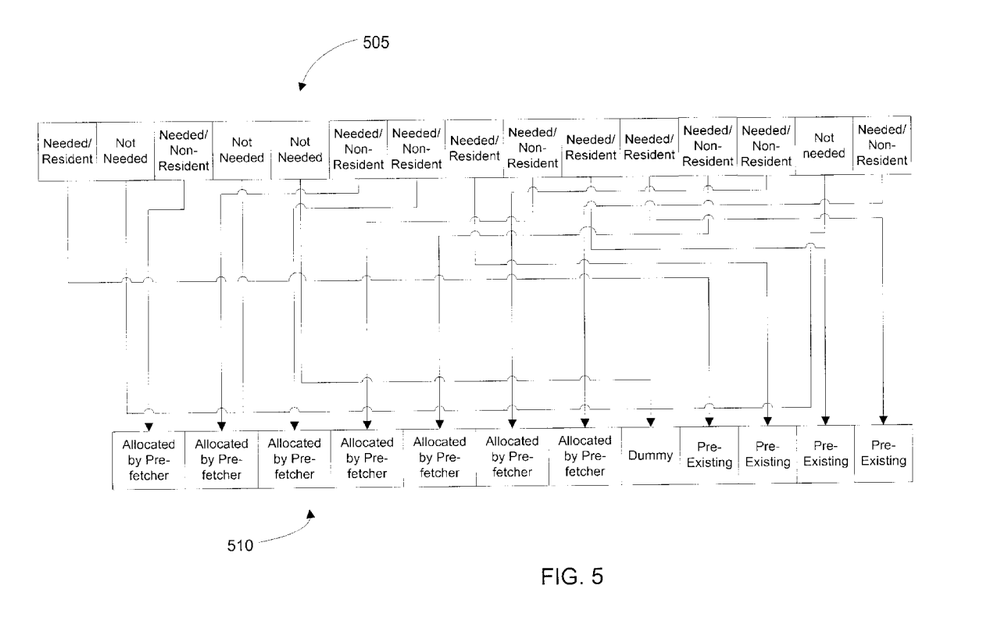
FIG. 5 is a diagram illustrating a plurality of memory pages being mapped to physical memory in accordance with an embodiment of the present invention.

Referring now to FIG. 5, a diagram illustrating a plurality of memory pages 505 (exes or dlls) mapped to physical memory 510 in accordance with an embodiment of the present invention will be described. In one embodiment, the invention is a method for building a series of MDLs (memory descriptor lists) for mapping a plurality of memory pages to physical memory as illustrated in FIG. 5. Each page described in the scenario file is checked to determine whether the page is already in physical memory. If a page is already in physical memory, then the page is discarded from consideration. For all pages not in physical memory, it is determined whether the file offsets in the disk space for each pair of consecutive pages is below a predetermined level. In a preferred embodiment, this level is 128 KB.

If it is determined that the file offsets between consecutive pages in the disk space is below a predetermined level, then the pages are put into the MDL. If the pages are not physically consecutive in the disk space, the gap between the pages is plugged by inserting the required number of dummy pages into the MDL. Dummy MDL pages reference one physical page so that the disk can stream the pages in without seeking.

If it is determined that the file offsets between consecutive pages is above a predetermined level, then the MDL ends and a new MDL is created beginning from the last page not entered into the previous MDL. It should be understood from the above description that large seeks (such that it's more efficient to seek than use dummy pages) break MDLs, so it's likely to have multiple MDLs for each section.

Therefore, referring to FIG. 5, pages 505 that are needed by the scenario and already resident in physical memory remain mapped to their preexisting physical memory. Pages not needed by the scenario but between consecutive pages in the MDL that are needed are mapped to a dummy physical memory location. Pages that are needed by the scenario and non-resident in physical memory are mapped to physical memory locations allocated by the pre-fetcher.

System Boot

It should be understood that, in one embodiment, the present invention may be used at system startup (system boot). Using pre-fetching of pages at system boot may decrease system boot times significantly. In one embodiment, the system boot scenario start and end are user-defined. In other words, the operating system when booting up determines when to start and stop the system boot scenario. For example, Win32 APIs may be used to define the start and end of the system boot scenario.

Prefetching Files Mapped as Data

Although the above description has been related to pages that are mapped files, such as dynamic link libraries (dlls) and executable files (exes), an embodiment of the present invention may be used to pre-fetch data files which are accessed as mapped files. Pre-fetching mapped data files may decrease system boot times and application startup times significantly. For example, at system boot, registry files are accessed as mapped files and may be pre-fetched. Thus, in one embodiment, the present invention may also be used to pre-fetch mapped constant data files rather than just executable images (dlls and exes).

Use of the Present Invention at the Physical Disk Level

In another embodiment, the present invention may be implemented at the physical disk level rather than at the file level. For example, rather than storing only the section type, file name and file offset for a page in a scenario file, the scenario file may actually store a physical disk sector number for a page. By working at the disk level, it may be possible to decrease application startup times even further. For example, files such as normal.dot may be used by executable files such as winword.exe. By prefetching files such as normal.dot, application and system startup times may be decreased even more. One main advantage of this approach is that file system metadata may be prefetched.

It should be understood that the foregoing pertains only to the preferred embodiments of the present invention, and that numerous changes may be made to the embodiments described herein without departing from the spirit and scope of the invention.

We claim:

1. In a computer system, a method for avoiding hard page faults during the booting of an operating system, the method comprising the steps of:

prior to booting the operating system, determining which pages will be retrieved from disk;

detecting that the operating system needs to be booted; and in response to detecting that the operating system needs to be booted, fetching the determined pages into a RAM of the computer system, whereby the determined pages will be available in the RAM and hard page faults will not occur during the booting of the operating system.

2. The method of claim 1, wherein the step of determining which pages will be retrieved from disk comprises the steps of:

creating a log of hard page faults that occur during the booting of the operating system;

analyzing the log to find a common hard page fault scenario for booting the operating system; and determining from the log which pages were retrieved from disk during the booting of the operating system.

3. The method of claim 1, wherein the pages are compressed in the disk storage; and wherein the method further comprises the step of decompressing the copies of the determined pages prior to fetching them into the RAM.

4. The method of claim 1, wherein a copy of each of the determined pages is stored in a scenario file; and wherein the step of fetching the determined pages into RAM comprises fetching the copy of each of the determined pages from the scenario file into RAM.

5. The method of claim 1, wherein a reference for each of the determined pages is stored in a referenced scenario file; and wherein the step of fetching the determined pages into RAM comprise accessing the referenced scenario file in order to locate and fetch the determined pages into memory.

6. The method of claim 5 wherein the determined pages are mapped data files.

7. The method of claim 5 wherein each page reference in the referenced scenario file comprises a reference to a section description (file name and mapping type), and a file offset for the page.

8. The method of claim 5 wherein each page reference in the referenced file scenario comprises a physical disk sector for the page.

9. In a computer system, a method for automatically detecting a hard page fault scenario, the method comprising the computer-implemented steps of:

detecting the start-up of an application program module;

determining if a scenario file exists;

if not, then running the application program module;

if a scenario file exists, then pre-fetching the pages in the scenario file into RAM and running the application program module; and logging a plurality of soft page faults and hard page faults into memory.

10. The method of claim 9 further comprising the steps of:

starting an end scenario timer;

resetting the end scenario timer each time a page fault is logged; and if the time between two logged page faults is such that the end scenario timer reaches a predetermined threshold, then ending the hard page fault scenario.

11. The method of claim 10 further comprising the steps of:

queuing a work item to post-process the scenario file and scenario log; and during idle time, post-processing the scenario file and scenario log.

12. The method of claim 11 further comprising the step of writing out a new scenario file.

13. The method of claim 11 wherein the step of post-processing the scenario file and scenario log comprises the steps of:

determining pages that are part of the scenario log and not already in the scenario file;

adding a scenario file entry to the scenario file for each page that is part of the scenario log and not already in the scenario file;

updating scenario file entries corresponding to pages that were used during the scenario to indicate that the page was used by the scenario;

deleting scenario file entries for pages that have not been used for a predetermined number of times; and sorting the scenario file entries.

14. The method of claim 13 wherein the step of updating scenario file entries corresponding to pages that were used during the scenario to indicate that the page was used by the scenario comprises setting a bit in a 32-bit field.

15. The method of claim 13 wherein the step of sorting the scenario file entries comprises sorting the scenario file entries according to the section ID and file offset of each page represented by each scenario file entry.

16. In a computer system, a method for detecting a hard page fault scenario, the method comprising the computer-implemented steps of:

detecting the start-up of an application program module;

determining if a scenario file exists;

if not, then running the application program module;

if a scenario file exists, then pre-fetching the pages in the scenario file into RAM and running the application program module;

logging a plurality of soft page faults and hard page faults into memory; and ending the hard page fault scenario when a Win32 hourglass cursor is replaced with a regular cursor.

17. A method for building a plurality of memory descriptor lists (MDLs) for mapping to physical memory a plurality of pages referenced in a scenario file, the method comprising the steps of:

determining whether each page referenced in the scenario file is already resident in physical memory and, if so, then discarding these pages from consideration;

for all pages not resident in physical memory, determining whether the file offsets for each pair of consecutive pages is below a predetermined level;

if so, then adding the pages to the MDL; and if the pages are not consecutive, plugging the gap between the pages by inserting a required number of references to one physical dummy page into the MDL.

18. The method of claim 17 wherein the dummy pages reference one page in the physical memory.

19. The method of claim 4 wherein the determined pages are mapped data files.

* * * * *

UNITED STATES PATENT AND TRADEMARK OFFICE
CERTIFICATE OF CORRECTION

PATENT NO. : 6,633,968 B2
DATED : October 14, 2003
INVENTOR(S) : Zwiegincew et al.

It is certified that error appears in the above-identified patent and that said Letters Patent is hereby corrected as shown below:

Column 1,
Line 25, delete "modem" and insert -- modern --.

Column 6,
Lines 45-46, delete
"system.
 The"
and insert -- system. The --.

Signed and Sealed this

Thirtieth Day of December, 2003

JAMES E. ROGAN
*Director of the United States Patent and Trademark Office*